(12) United States Patent
Srinivasan et al.

(10) Patent No.: US 11,301,338 B2
(45) Date of Patent: Apr. 12, 2022

(54) RECOVERY ON VIRTUAL MACHINES WITH EXISTING SNAPSHOTS

(71) Applicant: EMC IP Holding Company LLC, Hopkinton, MA (US)

(72) Inventors: Sharath Talkad Srinivasan, Bengaluru (IN); Mahesh Rao, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 153 days.

(21) Appl. No.: 16/136,800

(22) Filed: Sep. 20, 2018

(65) Prior Publication Data

US 2020/0097370 A1 Mar. 26, 2020

(51) Int. Cl.
| | |
|---|---|
| *G06F 11/00* | (2006.01) |
| *G06F 11/14* | (2006.01) |
| *G06F 9/455* | (2018.01) |
| *G06F 3/04842* | (2022.01) |

(52) U.S. Cl.
CPC ...... *G06F 11/1469* (2013.01); *G06F 9/45558* (2013.01); *G06F 11/1464* (2013.01); *G06F 11/1484* (2013.01); *G06F 3/04842* (2013.01); *G06F 2009/45591* (2013.01); *G06F 2201/815* (2013.01); *G06F 2201/82* (2013.01); *G06F 2201/84* (2013.01)

(58) Field of Classification Search
CPC ............. G06F 11/1469; G06F 11/1464; G06F 11/1484; G06F 11/1458; G06F 11/1479; G06F 11/1482; G06F 9/45558; G06F 9/45533; G06F 3/04842; G06F 3/0484; G06F 2009/45591; G06F 2201/815; G06F 2201/82; G06F 2201/84; G06F 16/11; G06F 16/128; G06F 16/2365; G06F 11/1451

See application file for complete search history.

(56) References Cited

U.S. PATENT DOCUMENTS

| | | | |
|---|---|---|---|
| 8,745,523 B2 * | 6/2014 | McInerney | ......... G06F 11/1448 715/783 |
| 10,216,583 B1 * | 2/2019 | Krinke | .................. G06F 16/128 |
| 2005/0149577 A1 * | 7/2005 | Okada | ................ G06F 11/1458 |
| 2009/0313620 A1 * | 12/2009 | Sedukhin | ............ G06F 9/45558 718/1 |

* cited by examiner

*Primary Examiner* — Anthony J Amoroso
(74) *Attorney, Agent, or Firm* — Womble Bond Dickinson (US) LLP

(57) ABSTRACT

According to one embodiment, in response to a request to revert a virtual machine (VM) to a previously backed up consistent state, whether there are one or more existing consistent states on the VM is determined. In response to determining that there are one or more existing consistent states on the VM, a consolidation or deletion of the one or more existing consistent states is initiated based on a selection to consolidate or to delete the one or more existing consistent states. Whether the consolidation or deletion of the one or more existing consistent states was successful is determined. A recovery operation to revert the VM to the previously backed up consistent state is initiated in response to determining that the consolidation or deletion of the one or more existing consistent states was successful.

21 Claims, 6 Drawing Sheets

RECOVERY ON VIRTUAL MACHINES WITH EXISTING SNAPSHOTS

FIELD OF THE INVENTION

Embodiments of the present disclosure relate generally to system recovery. More particularly, embodiments of the disclosure relate to recovery on virtual machines with existing snapshots.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). Today, many virtualization platforms (e.g., Microsoft Hyper-V Server) allow a user to create a point-in-time snapshot or saved state (also referred to as consistent state or checkpoint) of a VM at any stage. Such checkpoint can subsequently be applied to revert to a previous state of the VM, thereby allowing a user to undo any catastrophic changes to the environment and reverting to a stable machine state when the checkpoint was created.

Unfortunately, to perform a recovery on a VM, a user must be mindful that the VM, on which the recovery operation is performed, does not contain any existing snapshots on the VM. If there are existing snapshots, the user would need to manually delete the VM snapshots or consolidate the snapshots manually to facilitate the recovery operation. Otherwise, a failure will occur when the recovery is performed.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
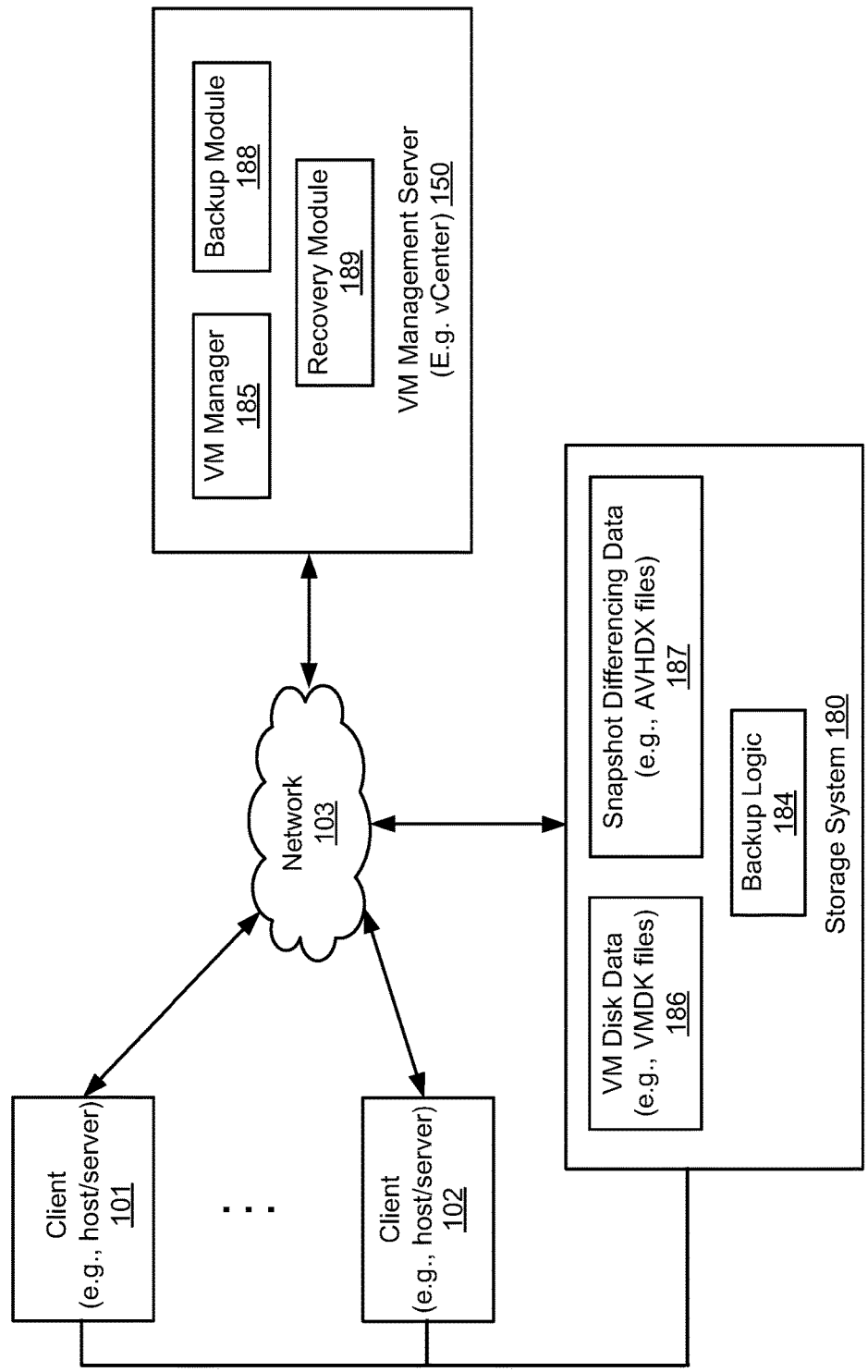
FIG. 1 is a block diagram illustrating a storage system according to one embodiment.

Various embodiments and aspects of the disclosure will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, in response to a request to revert a virtual machine (VM) to a previously backed up consistent state, whether there are one or more existing consistent states on the VM is determined. In response to determining that there are one or more existing consistent states on the VM, a consolidation or deletion of the one or more existing consistent states is initiated based on a selection to consolidate or to delete the one or more existing consistent states. Whether the consolidation or deletion of the one or more existing consistent states was successful is determined. A recovery operation to revert the VM to the previously backed up consistent state is initiated in response to determining that the consolidation or deletion of the one or more existing consistent states was successful. In this way, the recovery operation of the VM would be successfully performed without any conflicting existing consistent states on the VM.

In one embodiment, to determine whether there are one or more existing consistent states on the VM, a request is sent to a virtual machine monitor (VMM) that manages the VM to check whether there are one or more existing consistent states on the VM. A response is received from the VMM indicating whether there are one or more existing consistent states on the VM. Whether there are one or more existing consistent states on the VM is determined based on the response.

In one embodiment, prior to initiating the consolidation or deletion of the one or more existing consistent states, a user is prompted with selectable options to either consolidate or to delete the one or more existing consistent states. A selected option is received from the user to consolidate or to delete the one or more existing consistent states.

In one embodiment, to determine whether the consolidation or deletion of the one or more existing consistent states was successful, status information is received from the VMM indicating that the consolidation or deletion of the one or more existing consistent states was successfully or unsuccessfully performed on the VM.

In one embodiment, to initiate the consolidation or deletion of the one or more existing consistent states, a first command is sent to consolidate or to delete the one or more existing consistent states based on the received selection option. In one embodiment, to initiate the recovery operation to revert the VM to the previously backed up consistent state, a second command is sent to trigger the recovery operation on the VM.

In one embodiment, in response to determining that there is no existing consistent state on the VM, the recovery operation is initiated to revert the VM to the previously backed up consistent state.

In one embodiment, the recovery operation is aborted in response to determining that the consolidation or deletion of the one or more existing consistent states was unsuccessful.

FIG. 1 is a block diagram illustrating a storage system according to one embodiment. Referring to FIG. 1, system 100 includes, but is not limited to, one or more client systems 101-102 communicatively coupled to VM management server 150 (also referred to as virtual center or vCenter) and storage system 180 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system). Network 103 may be any type of networks such as a local area network (LAN), a wide area network (WAN) such as the Internet, a fiber network, a storage network, or a combination thereof, wired or wireless.

In one embodiment, VM management server 150 includes, but is not limited to, VM manager 185, backup module 188 (also referred to as backup logic or backup engine), and recovery module 189 (also referred to as recovery logic or recovery engine). VM management server 150 manages VM configuration information of client 101 and/or client 102. For example, VM manager 185 may manage VM configuration information of multiple clients (e.g., clients 101-102), and each client contains one or more VMs managed by a virtual machine monitor (VMM) running therein. Although not shown in FIG. 1, VM Management server 150 may additionally be communicatively coupled with a backup application server and backup storage systems. In this example, VM management server 150 is communicatively coupled with clients 101-102 and storage system 180. In one embodiment, VM management server 150 may obtain VM information through various ways. For example, VM manager 185 may remotely synchronize with VMMs within network 103, or VMMs may update VM manager 185 whenever status change happens with VMs.

Figure 2:
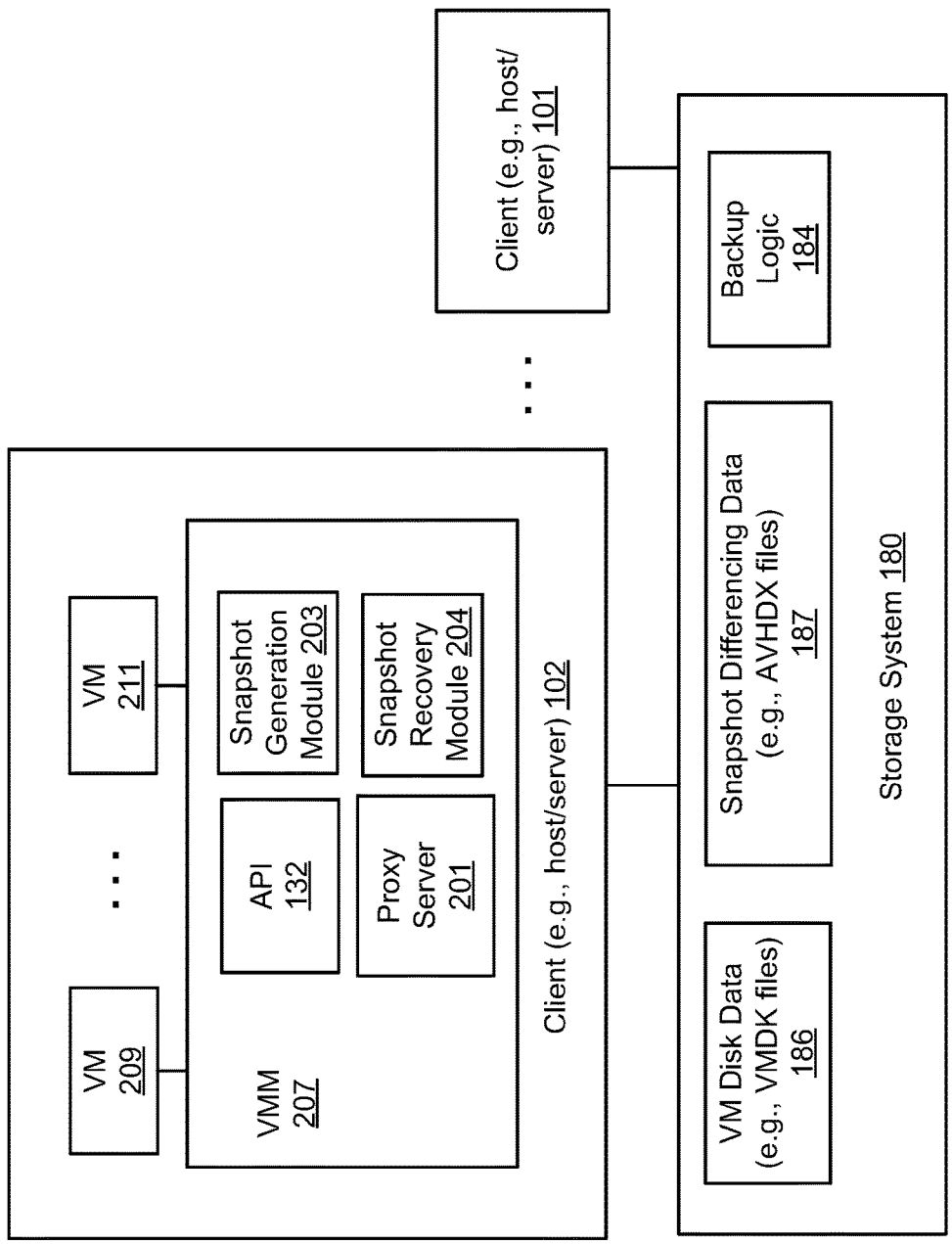
FIG. 2 is a block diagram illustrating clients and a storage system according to one embodiment.

Referring now to FIG. 2, which illustrates clients and a storage system according to one embodiment, VMM 207 includes, but is not limited to, application programming interface (API) 132, proxy server 201, snapshot generation module 203, and snapshot recovery module 204. API 132 allows any external system to communicate with VMM 207. Proxy server 201 allows VMM 207 to mount any VMs hosted on the client and to access files of the VMs. Snapshot generation module 203 can establish consistent states of VMs on the client. For example, VM management server 150 may send a backup request for VM 209 to VMM 207 via API 132. Snapshot generation module 203 of VMM 207 thereafter establishes a consistent state, or a snapshot, for VM 209. The snapshot may be included in VM disk data 186 (e.g., VMDK files) and/or included in snapshot differencing data 187 (e.g., AVHDX files). Snapshot recovery module 204 reverts or restores a VM (e.g., VMs 209-211) to a previously backed up or captured consistent state for that VM. For example, VM management server 150 may send a recovery request for VM 209 to VMM 207 via API 132. Snapshot recovery module 204 thereafter uses a previously backed up consistent state of the VM included in VM disk data 186 and/or snapshot differencing data 187 to recover the VM. That is, snapshot recovery module 204 reverts the VM to a previous state in accordance with the previously backed up consistent state. Proxy server 201 mounts the snapshot to allow file access to the snapshot.

Still referring to FIG. 2 in conjunction with FIG. 1, a user operating VM management server 150 can initiate a request to backup with a VM identifier (indicating VM 209 for example). Backup module 188 may identify that client 102 manages VMM 207, which hosts VM 209. Backup module 188 therefore may request VMM 207 via API 132 to establish a consistent state (also referred to as snapshot or checkpoint) of VM 209. Client 102 is communicatively coupled with storage system 180. The snapshot may be stored as part of VM disk data 186 and/or part of snapshot differencing data 187 on storage system 180.

In one embodiment, the user operating VM management server 150 can initiate a request to recover or revert a specific VM, for example using a VM identifier indicating VM 209, to a previously backed up or captured consistent state (e.g., a consistent state in VM disk data 186 and/or snapshot differencing data 187). For example, the user may select a recovery option, such as "Revert Both VM Configuration and Data" to revert the entire VM with operating system (OS) configuration files and VM data which overwrites the OS file system and the OS, or "Revert VM data only" to revert only the VM data while keeping the OS file system intact.

In one embodiment, to recover or revert the VM, recovery module 189 may be invoked to check with VMM 207 via API 132 to determine whether the VM has existing consistent states thereon. If the VM contains existing consistent states, recovery module 189 may prompt the user with options to consolidate or delete the existing consistent states. Otherwise, if there is no existing consistent state on the VM, recovery module 189 may send a command to initiate or trigger the recovery operation on the VM.

Based on a user selection, for example the user may select a "snapshot consolidation" or "snapshot ALL delete" option, recovery module 189 may send a command to VMM 207 via API 132 to consolidate or delete the existing consistent states. Once the consolidation or deletion of the consistent states is complete, VMM 207 may communicate status information to the recovery module 189 via API 132 to indicate whether the consolidation or deletion was successful. If the consolidation or deletion was successful, recovery module 189 may send a command to VMM 207 to initiate the recovery operation on the VM (e.g., any of VMs 209-211) in accordance with the user-selected recovery option. In this way, there are no conflicting consistent states when the recovery operation is performed on the VM. Otherwise, recovery module 189 may abort or cancel the recovery operation.

As shown in FIG. 2, for example, VM 209 resides on client 102. Client 102 includes one or more VMs 209-211 hosted by VMM 207. VMM 207 also includes the API 132, through which VMM 207 manages VMs 209-211. In one embodiment, the API 132 is a VM API such as VMware's vStorage APIs for Data Protection (VADP). In one embodiment, a user may request a backup or recovery of a VM from storage system 180. In another embodiment, a user may request the backup or recovery from VM management server 150, as previously described.

Storage system 180 may include any type of server or cluster of servers. For example, storage system 180 may be a storage server used for any of various different purposes, such as to provide multiple users with access to shared data and/or to back up mission critical data. Storage system 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 180 may have a distributed architecture, or all of its components may be integrated into a single unit. Storage system 180 may be implemented as part of a storage system available from EMC® Corporation of Hopkinton, Mass.

Storage system 180 contains backup logic 184 that manages both backup and restore processes within the storage system. Storage system 180 also contains VM disk data 186 that may include the content files of the VMs. Storage system 180 further contains snapshot differencing data 187 that may include disk image checkpoints, which bootstrap VMs (e.g., VMs 209-211) using disk images. A portion of snapshot differencing data (e.g., a snapshot differencing file) contains a point in time, which is used to make up a timeline with other portions of the snapshot differencing data in the chain. These portions enable a VM to revert to a previous state, which may allow a user to create a specific condition for troubleshooting a problem. In one embodiment, each portion of the snapshots differencing data 187 (e.g., a snapshot differencing file) may include the state, data, and hardware configuration of a VM (e.g., VMs 209-211) at the time of the file creation. Note that a storage system of a client may also be called the primary storage of the client to distinguish the storage from backup storage systems.

A VM represents a completely isolated operating environment with a dedicated set of virtual resources associated with it. A virtual machine may be installed or launched as a guest OS hosted by a host OS or a hypervisor. Typically, a host OS or hypervisor represents a VMM (e.g., VMM 207) for managing the hosted VMs. A VM can be any type of virtual machines, such as, for example, hardware emulation, full virtualization, para-virtualization, and operating system-level virtualization virtual machines. Different VMs hosted by a server may have the same or different privilege levels for accessing different resources. Here, VMM 207 manages both VM 209 and VM 211.

Figure 3:
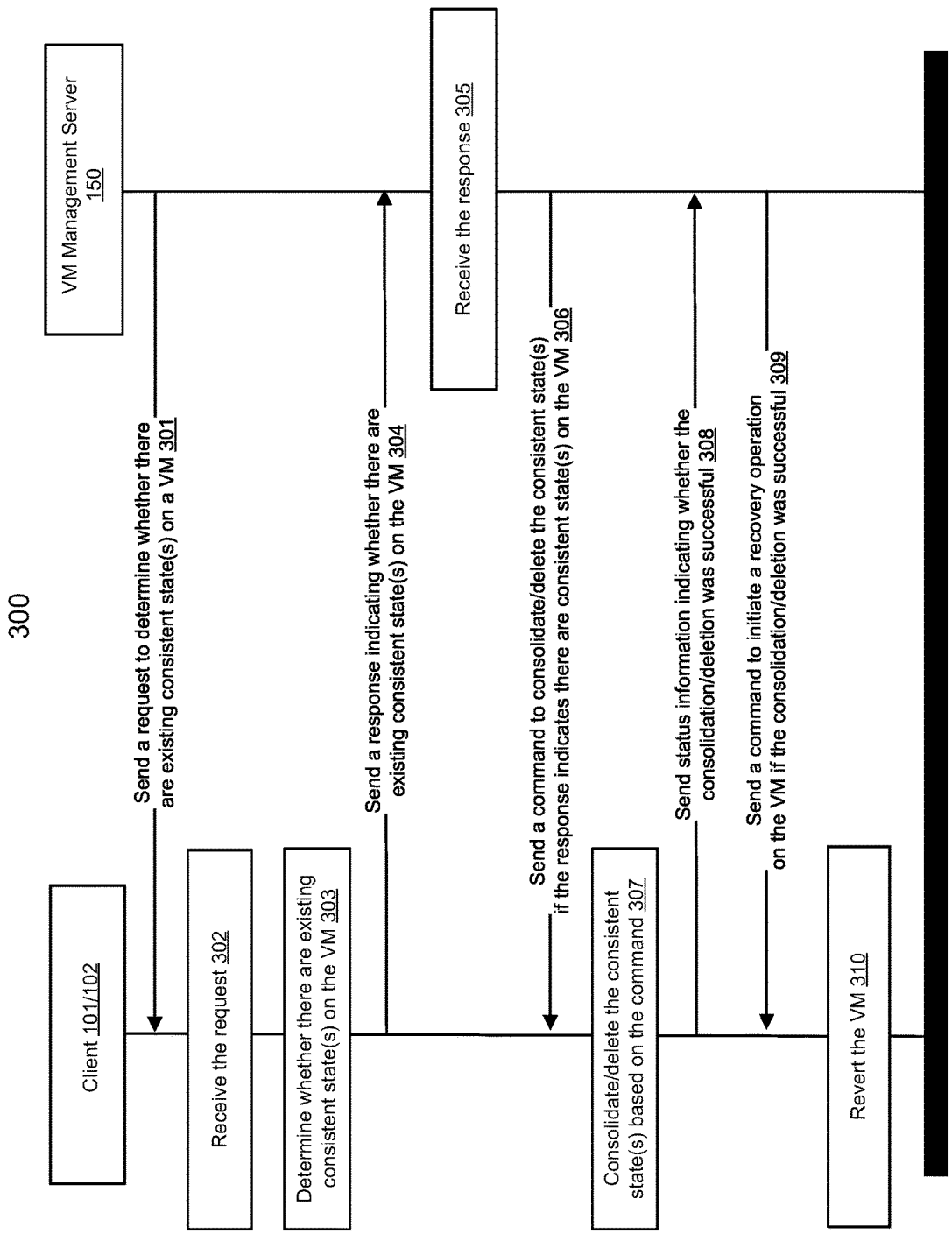
FIG. 3 is a flow diagram illustrating one embodiment of the disclosure.

Turning to FIG. 3, a process flow of actions or operations for recovery of a VM is illustrated. At operation 301, VM management server 150 sends a request to a client (e.g., any of clients 101-102 of FIG. 1) to determine whether there are one or more existing consistent states stored on a VM of the client (e.g., any of VMs 209-211 of FIG. 2). In one embodiment, the request may include a VM identifier identifying a specific VM. At operation 302, the client receives the request, and in response to the request, the client, via VMM 207 of FIG. 2 for example, determines whether there are existing consistent state(s) on the requested VM in operation 303. For example, VMM 207 may check a VM directory of the VM to determine whether there are existing consistent state(s) stored in the VM directory. At operation 304, the client sends a response to VM management server 150 indicating whether there are existing consistent state(s) stored on the VM.

At operation 305, VM management server 150 receives the response, which may include the VM identifier of the requested VM and information indicating whether there are existing consistent state(s) on the VM. At operation 306, if the VM management server 150 determines that the response indicates there are existing consistent state(s) on the VM, VM management server 150 may send a command to the client to consolidate or delete the consistent state(s). For example, a user operating VM management server 150 may be prompted to select an option to consolidate or delete the consistent state(s). VM management server 150 thereafter may send the command in accordance with the user selection.

At operation 307, based on the command, the client may consolidate or delete the consistent state(s). For example, if the command is a consistent state (or snapshot) delete command, VMM 207 may remove the existing consistent state(s) from a snapshot manager, such as VMware's Snapshot Manager. When the removal is performed, the consistent state(s) are consolidated and written to a parent consistent state disk and merge with the VM base disk. Deleting a consistent state (or snapshot) does not change the VM or other consistent states. Instead, deleting a consistent state consolidates the changes between consistent states and previous disk states, and writes all the data from a delta disk that contains the information about the deleted consistent state to the parent disk. When a base parent consistent state is deleted, all changes merge with the base VM disk. Generally, to delete a consistent state, a large amount of information needs to be read and written to a disk. This can reduce VM performance until consolidation is complete. Consolidating consistent states may remove redundant disks which improves VM performance and saves storage space. The amount of time it takes to delete a consistent state and consolidate consistent state data depends on the amount of data that the guest OS writes to the virtual disks after the last consistent state was captured. In one embodiment, the amount of time required to delete a consistent state is proportional to the amount of data the VM is writing during consolidation if the VM is powered on. Failure of disk consolidation can reduce the performance of VMs.

Still in reference to operation 307, in one embodiment, if the command is a consistent state (or snapshot) consolidation command, VMM 207 may search for hierarchies or delta disks to combine or consolidate the existing consistent state(s) on the VM without violating data dependency. After the consolidation, redundant disks may be removed which improves VM performance and saves storage space. In one embodiment, consistent state consolidation is useful when consistent state disks fail to compact after a delete or delete all operation is executed, or if the disks did not consolidate. This may happen, for example, if a consistent state is deleted but its associated disk does not commit back to the base disk.

With reference to operation 308, upon completion of the consolidation or deletion of the existing consistent state(s), VMM 207 may send status information to VM management server 150 to indicate whether the consolidation or deletion was successful. In response to the status information, if the consolidation or deletion was successful, at operation 309 VM management server 150 may send another command to the client (e.g., VMM 207) to initiate or trigger a recovery operation that reverts the VM to a previously backed up or captured consistent state (e.g., a consistent state included in VM disk data 186 and/or snapshot differencing data 187). At operation 310, the client (e.g., VMM 207) reverts the VM to the previously backed up consistent state in accordance with the command.

Figure 4:
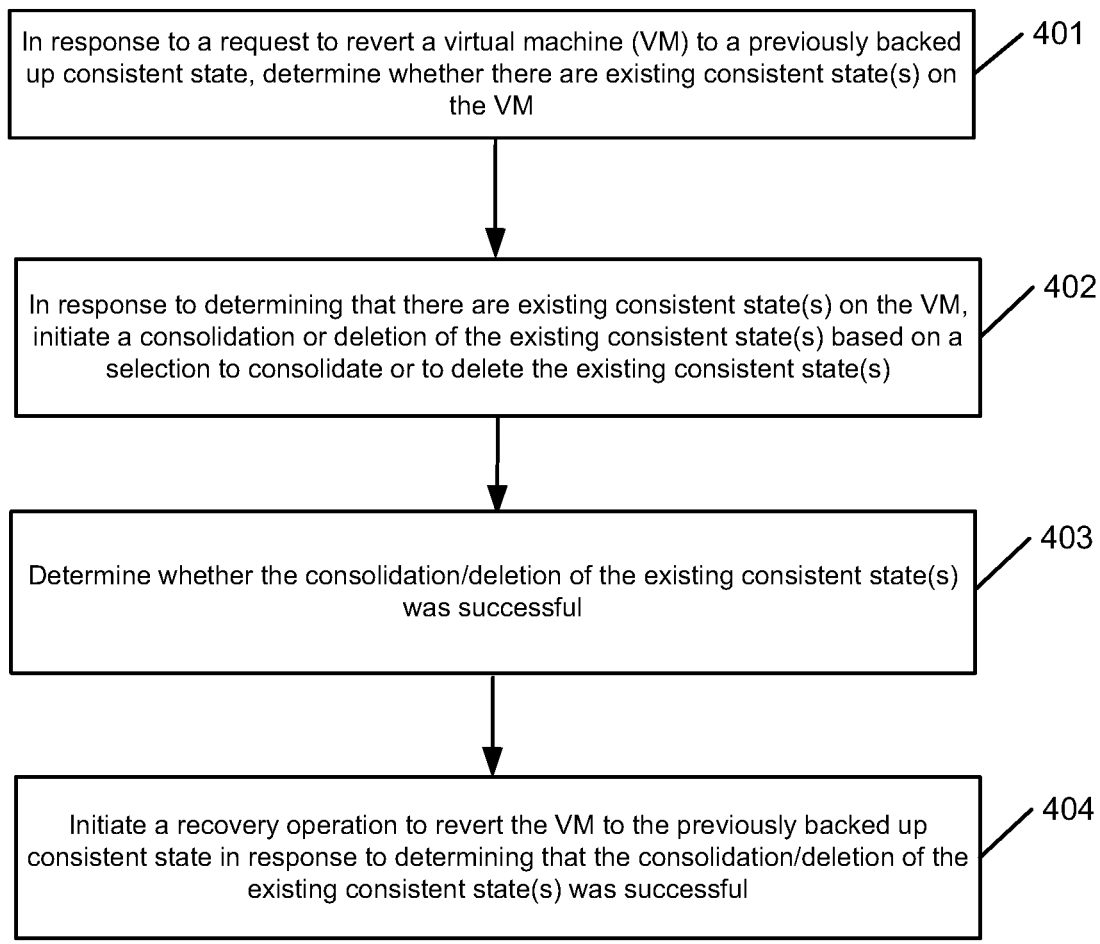
FIG. 4 is a flow diagram illustrating a recovery process according to one embodiment.

FIG. 4 is a flow diagram illustrating a recovery process according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by VM management server 150 of FIG. 1 (e.g., recovery module 189).

Referring to FIG. 4, at block 401, the processing logic, in response to a request to revert a VM to a previously backed up consistent state, determines whether there are one or more existing consistent states on the VM. For example, as previously described, VM management server 150 may send a request to a client (e.g., any of clients 101-102 of FIG. 1) to determine whether there are one or more existing consistent states stored on the VM. The client, via a VMM (e.g., VMM 207 of FIG. 2), may check a VM directory of the VM to determine whether there are existing consistent state(s) in the VM directory. The client then may send a response to VM management server 150 indicating whether there are existing consistent state(s) stored on the VM. At block 402, the processing logic in response to determining that there are existing consistent state(s) (e.g., based on the response received from the client), initiates a consolidation or deletion of the existing consistent state(s) on the VM based on a selection to consolidate or to delete the existing consistent state(s). For example, a user of VM management server 150 may be prompted with selectable options to either consolidate the existing consistent state(s) (e.g., "snapshot consolidation" option), or delete them (e.g., "snapshot ALL delete" option). A selected option is then received from the user either to consolidate or to delete the one or more existing consistent states. Subsequently, VM management server 150 may send a command to the VMM to consolidate or delete the existing consistent state(s) based on the received selected option. At block 403, the processing logic determines whether the consolidation or deletion of the existing consistent state(s) was successful, for example, based on the status information received from the VMM (as previously described). If so, at block 404, the processing logic initiates a recovery operation to revert the VM to the previously backed up consistent state. For example, as previously described, VM management server 150 may send a command to the client to initiate the recovery operation. Thereafter, VMM 207 on the client may perform the recovery operation on the VM which is hosted and managed by VMM 207.

Figure 5:
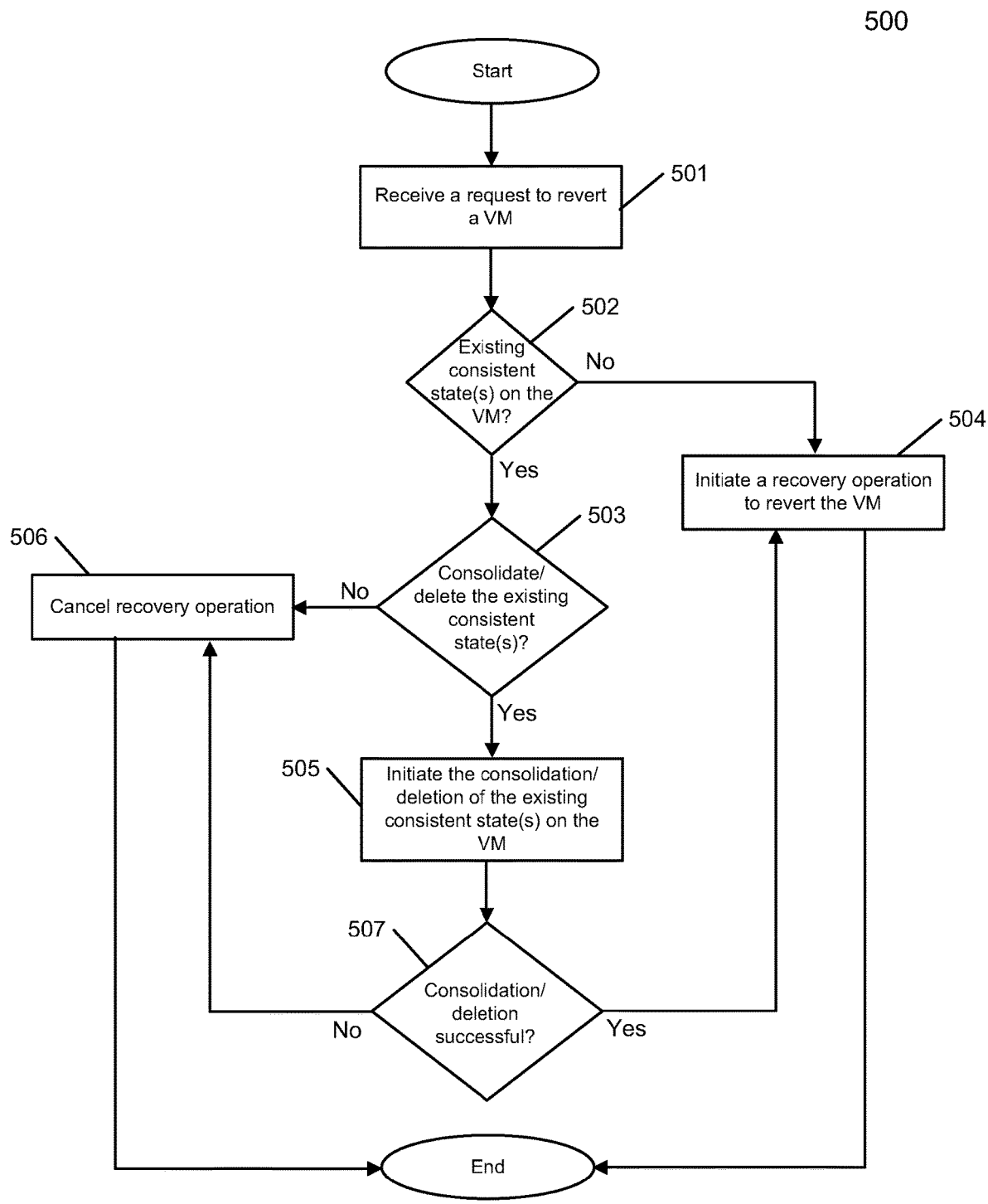
FIG. 5 is a flow diagram illustrating another recovery process according to one embodiment.

FIG. 5 is a flow diagram illustrating another recovery process according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by VM management server 150 of FIG. 1 (e.g., recovery module 189).

Referring to FIG. 5, at block 501, the processing logic receives a request to revert a VM. For example, a user operating VM management server 150 may select a recovery option, such as "Revert Both VM Configuration and Data" to revert the entire VM with operating system (OS) configuration files and VM data which overwrites the OS file system and the OS or "Revert VM data only" to revert only the VM data while keeping the OS file system intact, to initiate a request to revert the VM to a previously backed up or captured consistent state. At block 502, the processing logic determines whether there are one or more existing consistent states on the VM. For example, a request may be sent to a client (e.g., clients 101-102 of FIG. 1) to determine whether the VM contains the existing consistent state(s). Based on a response from the client, the processing logic may determine that the VM does or does not contain the existing consistent state(s). If there are existing consistent state(s) on the VM, the processing logic continues to block 503. Otherwise, the processing logic continues to block 504.

At block 503, the processing logic determines whether the existing consistent state(s) are to be consolidated or deleted. For example, a user operating a VM management server (e.g., server 150 of FIG. 1) may be prompted to select an option to either consolidate the existing consistent state(s) (e.g., "snapshot consolidation" option), or delete them (e.g., "snapshot ALL delete" option). Based on the user selection, whether the existing consistent state(s) are to be consolidated or deleted can be determined. If the existing consistent state(s) are to be consolidated or deleted, the processing logic continues to block 505. Otherwise, the processing logic continues to block 506.

At block 504, processing logic initiates a recovery operation to revert the VM, for example, by sending a command to a VMM that hosts and manages the VM to perform the recovery operation to revert the VM to the previously backed up consistent state.

At block 505, the processing logic initiates the consolidation or deletion of the existing consistent state(s) on the VM. For example, based on the user selection, a command may be sent to the VMM that manages the VM to consolidate or delete the consistent state(s) on the VM. At block 506, the processing logic cancels or aborts the recovery operation. Here, since existing consistent state(s) are detected on the VM and neither consolidation nor deletion of the consistent state(s) is performed, the recovery operation therefore is cancelled in order to avoid conflicts during the recovery operation that would lead to the failure of the recovery operation.

At block 507, the processing logic determines whether the consolidation or deletion was successfully performed. For instance, status information may be received from the VMM indicating that the consolidation or deletion was successful or unsuccessful. If the consolidation or deletion was successful, the processing logic proceeds to block 504 to initiate the recovery operation. Otherwise, the processing logic proceeds to block 506 to cancel the recovery operation.

Note that some or all of the components as shown and described above (e.g., recovery module 189 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
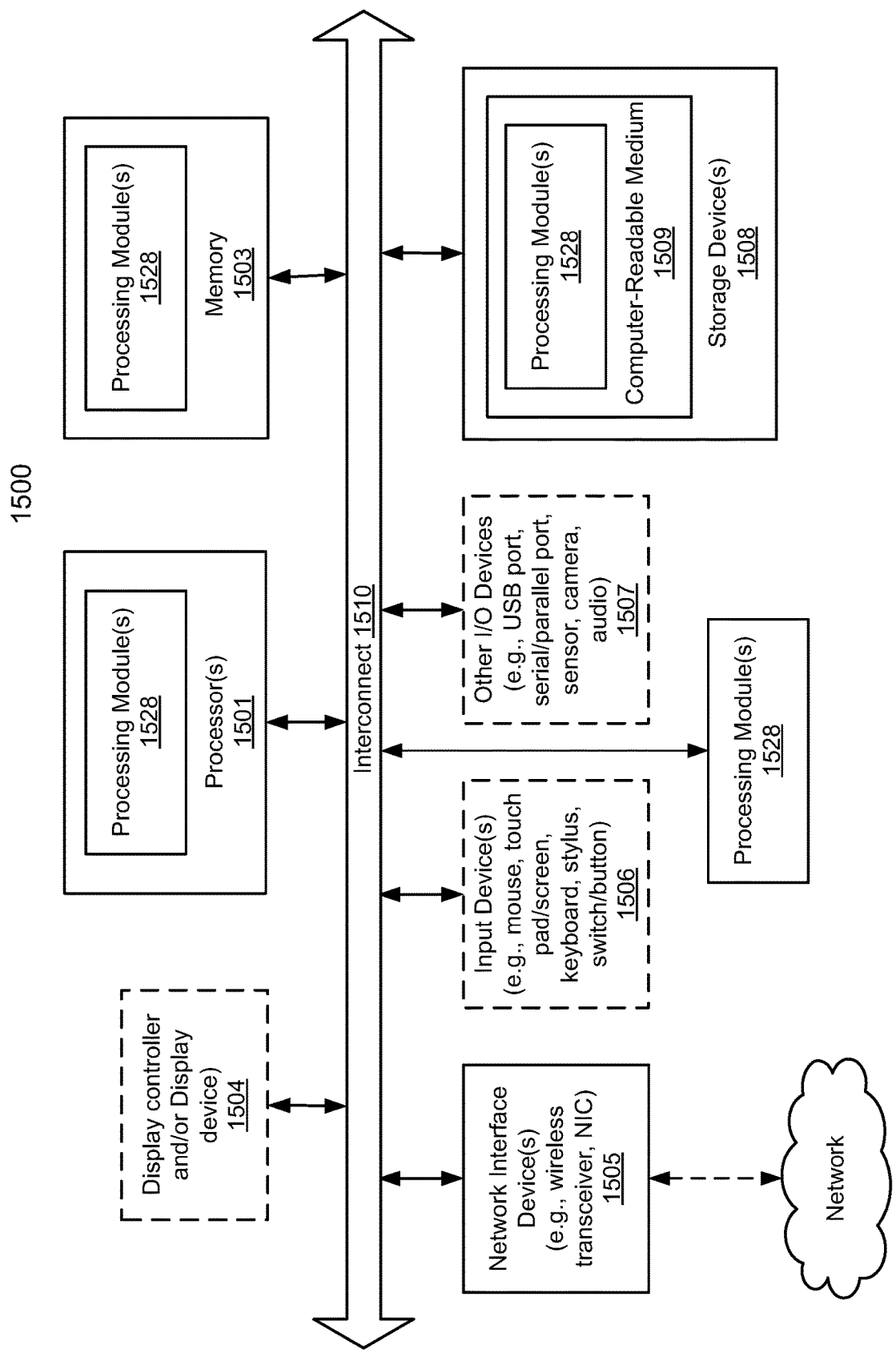
FIG. 6 is a block diagram illustrating a data processing system according to one embodiment.

FIG. 6 is a block diagram illustrating an example of a data processing system which may be used with one embodiment. For example, system 1500 may represents any of data processing systems such as clients 101-102, storage system 180 and/or VM management server 150 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to recover a virtual machine (VM), the method comprising:
    in response to a request to revert the VM to a previously backed up consistent state, determining whether there are one or more existing consistent states on the VM;
    in response to determining that there are one or more existing consistent states on the VM,
        prompting a user with selectable options including:
            a first option to consolidate the one or more existing consistent states, and
            a second option to delete the one or more existing consistent states,
        in response to selecting the first option, initiating a consolidation of the one or more existing consistent states on the VM including:
            searching for hierarchies and delta disks to combine the one or more existing consistent states on the VM without violating data dependency, and
            removing redundant disks to improve VM's performance and to save storage space,
        in response to selecting the second option, initiating a deletion of the one or more existing consistent states on the VM including:
            removing the one or more existing consistent states on the VM, wherein one or more existing consistent states are consolidated and written to a parent consistent state disk and merged with a VM base disk,
        determining whether the consolidation or deletion of the one or more existing consistent states was successful, and
        initiating a recovery operation to revert the VM to the previously backed up consistent state in response to determining that the consolidation or deletion of the one or more existing consistent states was successful.

2. The method of claim 1, wherein determining whether there are one or more existing consistent states on the VM comprises:

sending a request to a virtual machine monitor (VMM) that manages the VM to check whether there are one or more existing consistent states on the VM, receiving a response from the VMM indicating whether there are one or more existing consistent states on the VM, and determining whether there are one or more existing consistent states on the VM based on the response.

3. The method of claim 1, further comprising: prior to initiating the consolidation or deletion of the one or more existing consistent states, receiving a selected option from the user to consolidate or to delete the one or more existing consistent states.

4. The method of claim 3, wherein initiating the consolidation or deletion of the one or more existing consistent states comprises sending a first command to consolidate or to delete the one or more existing consistent states based on the received selected option, and initiating the recovery operation to revert the VM to the previously backed up consistent state comprises sending a second command to trigger the recovery operation on the VM.

5. The method of claim 1, wherein determining whether the consolidation or deletion of the one or more existing consistent states was successful comprises receiving status information from a virtual machine monitor (VMM) indicating that the consolidation or deletion of the one or more existing consistent states was successfully or unsuccessfully performed on the VM.

6. The method of claim 1, further comprising: in response to determining that there is no existing consistent state on the VM, initiating the recovery operation to revert the VM to the previously backed up consistent state.

7. The method of claim 1, further comprising: aborting the recovery operation in response to determining that the consolidation or deletion of the one or more existing consistent states was unsuccessful.

8. A non-transitory machine-readable medium having instructions stored therein, which when executed by a processor, cause the processor to perform operations, the operations comprising:

in response to a request to revert a virtual machine (VM) to a previously backed up consistent state, determining whether there are one or more existing consistent states on the VM;

in response to determining that there are one or more existing consistent states on the VM, prompting a user with selectable options including:

a first option to consolidate the one or more existing consistent states, and a second option to delete the one or more existing consistent states, in response to selecting the first option, initiating a consolidation of the one or more existing consistent states on the VM including:

searching for hierarchies and delta disks to combine the one or more existing consistent states on the VM without violating data dependency, and removing redundant disks to improve VM's performance and to save storage space, in response to selecting the second option, initiating a deletion of the one or more existing consistent states on the VM including:

removing the one or more existing consistent states on the VM, wherein one or more existing consistent states are consolidated and written to a parent consistent state disk and merged with a VM base disk, determining whether the consolidation or deletion of the one or more existing consistent states was successful, and initiating a recovery operation to revert the VM to the previously backed up consistent state in response to determining that the consolidation or deletion of the one or more existing consistent states was successful.

9. The non-transitory machine-readable medium of claim 8, wherein determining whether there are one or more existing consistent states on the VM comprises:

sending a request to a virtual machine monitor (VMM) that manages the VM to check whether there are one or more existing consistent states on the VM, receiving a response from the VMM indicating whether there are one or more existing consistent states on the VM, and determining whether there are one or more existing consistent states on the VM based on the response.

10. The non-transitory machine-readable medium of claim 8, wherein the operations further comprise: prior to initiating the consolidation or deletion of the one or more existing consistent states, receiving a selected option from the user to consolidate or to delete the one or more existing consistent states.

11. The non-transitory machine-readable medium of claim 10, wherein initiating the consolidation or deletion of the one or more existing consistent states comprises sending a first command to consolidate or to delete the one or more existing consistent states based on the received selected option, and initiating the recovery operation to revert the VM to the previously backed up consistent state comprises sending a second command to trigger the recovery operation on the VM.

12. The non-transitory machine-readable medium of claim 8, wherein determining whether the consolidation or deletion of the one or more existing consistent states was successful comprises receiving status information from a virtual machine monitor (VMM) indicating that the consolidation or deletion of the one or more existing consistent states was successfully or unsuccessfully performed on the VM.

13. The non-transitory machine-readable medium of claim 8, wherein the operations further comprise: in response to determining that there is no existing consistent state on the VM, initiating the recovery operation to revert the VM to the previously backed up consistent state.

14. The non-transitory machine-readable medium of claim 8, wherein the operations further comprise: aborting the recovery operation in response to determining that the consolidation or deletion of the one or more existing consistent states was unsuccessful.

15. A data processing system, comprising:

a processor; and a memory coupled to the processor to store instructions, which when executed by the processor, cause the processor to perform operations, the operations including:

in response to a request to revert a virtual machine (VM) to a previously backed up consistent state, determining whether there are one or more existing consistent states on the VM;

in response to determining that there are one or more existing consistent states on the VM,
  prompting a user with selectable options including:
    a first option to consolidate the one or more existing consistent states, and
    a second option to delete the one or more existing consistent states,
  in response to selecting the first option, initiating a consolidation of the one or more existing consistent states including:
    searching for hierarchies and delta disks to combine the one or more existing consistent states on the VM without violating data dependency, and
    removing redundant disks to improve VM's performance and to save storage space,
  in response to selecting the second option, initiating a deletion of the one or more existing consistent states on the VM including:
    removing the one or more existing consistent states on the VM, wherein one or more existing consistent states are consolidated and written to a parent consistent state disk and merged with a VM base disk,
  determining whether the consolidation or deletion of the one or more existing consistent states was successful, and
  initiating a recovery operation to revert the VM to the previously backed up consistent state in response to determining that the consolidation or deletion of the one or more existing consistent states was successful.

16. The data processing system of claim 15, wherein determining whether there are one or more existing consistent states on the VM comprises:
  sending a request to a virtual machine monitor (VMM) that manages the VM to check whether there are one or more existing consistent states on the VM,
  receiving a response from the VMM indicating whether there are one or more existing consistent states on the VM, and
  determining whether there are one or more existing consistent states on the VM based on the response.

17. The data processing system of claim 15, wherein the operations further include: prior to initiating the consolidation or deletion of the one or more existing consistent states,
  receiving a selected option from the user to consolidate or to delete the one or more existing consistent states.

18. The data processing system of claim 17, wherein
  initiating the consolidation or deletion of the one or more existing consistent states comprises sending a first command to consolidate or to delete the one or more existing consistent states based on the received selected option, and
  initiating the recovery operation to revert the VM to the previously backed up consistent state comprises sending a second command to trigger the recovery operation on the VM.

19. The data processing system of claim 15, wherein determining whether the consolidation or deletion of the one or more existing consistent states was successful comprises receiving status information from a virtual machine monitor (VMM) indicating that the consolidation or deletion of the one or more existing consistent states was successfully or unsuccessfully performed on the VM.

20. The data processing system of claim 15, wherein the operations further include: in response to determining that there is no existing consistent state on the VM, initiating the recovery operation to revert the VM to the previously backed up consistent state.

21. The data processing system of claim 15, wherein the operations further include: aborting the recovery operation in response to determining that the consolidation or deletion of the one or more existing consistent states was unsuccessful.

* * * * *